3,297,665
NOVEL COPOLYMERS OF VINYLBENZYL ALKYL
ETHERS AND ACRYLAMIDES
John G. Abramo, Rochester, N.Y., assignor to Monsanto
Company, St. Louis, Mo., a corporation of Delaware
No Drawing. Filed May 11, 1964, Ser. No. 366,603
1 Claim. (Cl. 260—80.3)

The present invention is a continuation-in-part of that claimed in copending application, S.N. 17,455, filed March 25, 1960, and now abandoned, and relates to synthetic copolymers or interpolymers and more particularly to copolymers or interpolymers of vinylbenzyl alkyl ethers.

Homopolymerizations of vinylbenzyl alkyl ethers have been suggested. However, the copolymerization of these ethers with acrylamide components have not been carried out. It has now been discovered that the presence of these ethers in copolymers or interpolymers of the same with acrylamides can have a salutory effect on the physical properties exhibited by the same. In particular, and when present in defined amounts, these ethers will contribute to copolymers of the same with acrylamides, a lower glass transition point Tg or softening point than that evidenced by homopolymers of the acrylamides. As a result, the copolymeric products will have greater resilience, making them useful in application for which the acrylamide homopolymers are not adapted.

Accordingly, it is a principal object of this invention to provide synthetic copolymers or interpolymers of vinylbenzyl alkyl ethers with acrylamides.

Other objects of the invention will in part be obvious and will in part appear hereinafter.

These and other objects of the invention can be attained in a copolymer constituting in copolymerized or interpolymerized form (A) a vinylbenzyl alkyl ether having the structure:

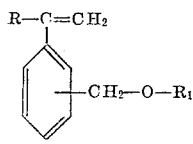

wherein R is selected from the class consisting of hydrogen and methyl radical and $R_1$ is a 1–12 carbon atom alkyl radical with (B) an acrylamide having the structure:

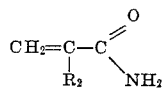

wherein $R_2$ is selected from the class consisting of hydrogen and methyl radical.

The following examples are given in illustration of the invention. Where parts are mentioned, parts by weight are intended unless otherwise described.

Example I

A 300 ml. stainless steel bomb is cooled to −30° C. in a Dry Ice bath and charged with 12.5 grams of p-isopropenylbenzyl methyl ether, 37.5 grams of acrylic amide, 100 grams of toluene, 0.5 gram of ditertiary butyl peroxide, and 0.25 gram of tertiary dodecyl mercaptan. The bomb is flushed with nitrogen, sealed and heated to 120° C. for 24 hours. The bomb is cooled to room temperature, vented, and the viscous polymer solution is poured into 500 ml. of ethanol. The precipitated polymer is dried for 16 hours at room temperature under vacuo. There is obtained about 40 grams of a clear, colorless and flexible copolymer. Infrared and elemental analysis establishes that this is a copolymer of p-isopropenylbenzyl methyl ether and acrylic amide.

Example II

A Pyrex glass tube is charged with 4 grams of p-vinylbenzyl n-octyl ether, 3 grams of methacrylic amide and a small amount of alpha,alpha'-azodi-isobutyronitrile. The tube is flushed with nitrogen, sealed and heated at 90° C. for 20 hours. A clear, colorless and flexible copolymer is obtained. Infrared and elemental analysis establishes that this is a coplymer of p-vinylbenzyl n-octyl ether and methacrylic amide.

Example III

A solution of 8 grams of acrylic amide, 2 grams of p-vinylbenzyl ethyl ether, 50 grams of ethanol and 0.02 gram of alpha, alpha-azodi-isobutyronitrile is heated to reflux about 78° C. under a nitrogen atmosphere for 60 hours. During this period the viscosity of the solution increases. At the end of this heating period the reaction mixture is diluted with an additional 100 ml. of ethanol and the resulting solution is poured into 500 ml. of hexane. The resulting flocculent precipitate is collected on a filter and dried at room temperatures for 16 hours in vacuo. Infrared analysis of the polymer shows the presence of amide and ether groups establishing the identity of the product as a copolymer of acrylamide and p-vinylbenzyl ethyl ether.

Example IV

A 2 liter stirred autoclave is charged with 1,000 grams of water and 20 grams of sodium laurate. The autoclave is closed, the agitator is started and flushed with nitrogen and heated to 100° C. To this heated solution is added concurrently over a period of 8 hours (1) a solution of 200 grams of acrylic amide, 100 grams of p-vinylbenzyl methyl ether and 0.75 gram of tertiary dodecyl mercaptan and (2) a solution of 2 grams of potassium persulfate in 200 ml. of water. The bomb is allowed to cool to room temperature and is vented. A latex of the copolymer is obtained containing about 20% solids. A small sample of the latex is poured into ethanol and the polymer is recovered and dried in vacuo at room temperature for 16 hours. Infrared and elemental analysis establishes that this is a copolymer of vinylbenzyl methyl ether and acrylic amide.

Example V

A random web of cotton fibers is dipped into the polymer latex obtained in Example IV. The treated web is then dried at room temperature and heated to 150° C. for 1 hour. On examination the web is found to be bonded into a nonwoven fabric possessing good strength and flexible hand. On dipping this fabric into solvents such as xylene, dimethyl formamide and acetone it is found that the copolymer binder is not removed and the strength and hand of the fabric is not impaired.

The present invention is directed to copolymers comprising in copolymerized or interpolymerized form (A) a vinylbenzyl alkyl ether having the structure:

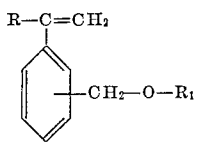

wherein R is selected from the class consisting of hydrogen and methyl radical and $R_1$ is a 1–12 carbon atom alkyl radical with (B) an acrylamide having the structure:

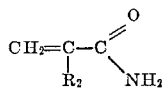

wherein $R_2$ is selected from the class consisting of hydrogen and methyl radical; that is, acrylic amide and methacrylic amide.

The vinylbenzyl alkyl ethers which can be used as monomeric components include those having the structure:

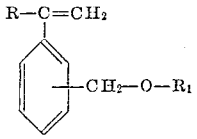

wherein R is selected from the class consisting of hydrogen and methyl radical and $R_1$ is a 1–12 carbon atom alkyl radical. The preferred ethers are those in which $R_1$ represents a saturated alkyl radical which can be straight, branched or cyclic in nature and containing 1–12 carbon atims. Representative of the subject ethers are the o-vinylbenzyl methyl ether, m-vinylbenzyl methyl ethers and p-vinylbenzyl methyl ethers through the o-vinylbenzyl dodecyl ethers, m-vinylbenzyl dodecyl ethers and the p-vinylbenzyl dodecyl ethers when $R_1$ represents hydrogen; and when $R_1$ represents a methyl radical the o-isopropenyl benzyl methyl ethers, m-isopropenyl benzyl methyl ether and p-isopropenyl benzyl methyl ethers through the o-isopropenyl benzyl dodecyl ethers, m-isopropenyl benzyl dodecyl ethers and p-isopropenyl benzyl dodecyl ethers. Various simple substituents such as the halogens and alkyl radicals can also be accommodated on the phenyl radical, to provide vinylbenzyl alkyl ethers intended to be included here. Additionally, mixtures of these ethers can be used. The subject ethers can be produced in the manner set forth in copending application S.N. 747,828, filed July 11, 1958 and now U.S. Patent Number 3,055,947.

Copolymers containing in copolymerized or interpolymerized form 20–60% by weight of vinylbenzyl alkyl ether and, correspondingly, 80–40% by weight of the acrylamide component (B) are most advantageous.

The copolymers of the present invention can be prepared using mass, solution or emulsion polymerization techniques.

In the mass and solution polymerization, a monomer mixture is prepared of from 20–60 parts by weight of vinylbenzyl alkyl ether and from 80–40 parts by weight of the previously defined acrylamide component (B), parts by weight being on the total weights of monomer. The monomer mixture is subjected to heating at about 60 to 180° C. under at least autogenous pressure until the monomers become copolymerized or interpolymerized. Copolymerization can be thermally initiated, but it is preferred to use a small quantity of a free radical polymerization initiator such as hydrogen peroxide, ditertiarybutyl peroxide, benzoyl peroxide, tertiary butyl perbenzoate, pinacolone peroxide, ditertiarybutyl hydroperoxide, azo-bis-isobutyronitrile, etc. The amount of such initiator employed will generally fall within the range of about 0.05 to 5.0 parts by weight per 100 parts of total monomer. This, however, can be varied.

The solvents suitable for use in the solution-type of polymerization are organic liquids which are inert to the reaction, e.g., toluene, xylene, benzene, dioxane, etc.

In the emulsion polymerization, a monomeric mixture prepared as above, is continuously and slowly added to an excess of water maintained at a polymerization temperature of −20 to 150° C. and autogenous pressure. An emulsifying agent and a polymerization catalyst are necessary in carrying out this type of polymerization. Either or both can be initially present in the water in whole or in part, or added as an aqueous solution together with the nonomeric mixtures. The amount of water to be used can be varied within wide limits. It is generally preferable, however, to use from about 100–300 parts of water per 100 parts of monomeric mixture in order to obtain aqueous copolymer latices constituting from 25–50% solids by weight.

The identity of the emulsifying agents can be varied. They can be nonionic, anionic or cationic. Those which operate satisfactorily either alone or in mixtures thereof include salts of high molecular weight fatty acids, quaternary ammonium salts, alkali metal salts of rosin acids, alkali metal salts of long chain sulfates and sulfonates, ethylene oxide condensates of long-chain fatty acids, alcohols or mercaptans, sodium salts of sulfonated hydrocarbons, aralkyl sulfonates, etc. Representative of emulsifiers which can be used are sodium laurate, triethanolamine, sodium lauryl sulfate, 2-ethylhexyl esters of sulfosuccinic acid, sodium salt of dioctyl sulfosuccinic acid, etc. Generally from about 0.1–5.0 parts by weight of emulsifier per 100 parts of total monomer operates quite satisfactorily.

Polymerization initiators or catalysts suitable for use in the emulsion-type polymerizations designed to produce the copolymers of the present invention include free radical initiators such as potassium persulfate, cumene hydroperoxide, ammonium persulfate as well as various of the redox-type catalyst systems represented by combinations of any of hydrogen peroxide, potassium persulfate, cumene hydroperoxide, tertiarybutylisopropyl benzene hydroperoxide, diisopropylbenzene hydroperoxide, etc. with any of potassium ferricyanide, dihydroxyacetone, sodium formaldehyde sulfoxylate, triethanolamine, glucose, fructose, etc. The amount of initiator utilized conveniently can range from about 0.05–5.0 parts by weight per 100 parts by weight of total monomer. Note that when the redox-type catalysts are used in emulsion-type polymerization, the temperature can range far below the minimum temperature indicated previously. When this embodiment is to be used the system is provided with antifreezes such as methanol, etc., chain regulators such as mercaptan and an electrolyte such as sodium sulfate, potassium chloride, etc. Using this embodiment temperatures well below 0° C. and even as low as −35° C. can be used as polymerization temperatures.

The copolymers of the present invention have broad application as reflecting their choice of constituency. They can be used in film, coating, adhesive and molding applications. They also can be compounded with various fillers, solvents, plasticizers, etc. as the occasion dictates.

It will thus be seen that the objects set forth above among those made apparent from the preceding description are efficiently attained and since certain changes may be made in carrying out the above process and in the synthetic polymer products which result without departing from the scope of the invention, it is intended that all matter contained in the above description shall be interpreted as illustrative and not in a limiting sense.

What is claimed is:

A flexible synthetic copolymer of (A) 20–60% by weight of a vinylbenzyl alkyl ether having the structure:

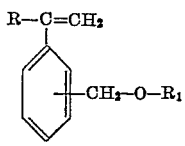

with (B) correspondingly, 80–40% by weight of an acrylamide having the structure:

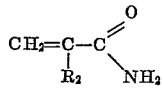

prepared by copolymerizing a mixture of the vinylbenzyl alkyl ether and the acrylamide, in proportions sufficient to attain the above polymeric proportions, in the presence of a free radical catalyst, the total of (A) and (B) being 100% by weight; wherein in the above structural formulae, R and $R_2$ are independently selected from the class consisting of hydrogen and methyl and $R_1$ is a 1–12 carbon atom alkyl.

References Cited by the Examiner

UNITED STATES PATENTS 2,522,501  9/1950  Brooks et al. _____ 260—47
2,656,341  10/1953  D'Alelio _____ 260—47

JOSEPH L. SCHOFER, *Primary Examiner.*

JAMES A. SEIDLECK, *Examiner.*

H. WONG, *Assistant Examiner.*